(12) United States Patent
Phuong et al.

(10) Patent No.: US 12,531,938 B2
(45) Date of Patent: Jan. 20, 2026

(54) COMMUNICATION PROTOCOL FOR INFERENCE OF PHYSICAL SLOT IDENTIFIER BY BASEBOARD MANAGEMENT CONTROLLER OF BLADE SERVER

(71) Applicant: Cisco Technology, Inc., San Jose, CA (US)

(72) Inventors: Scott Phuong, Belmont, CA (US); Krishna Prasad Pidamale, Pleasanton, CA (US); Kevin Russell Babst, Portland, OR (US); Jared Lewis, Beaverton, OR (US); Anant Thakar, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 18/101,003

(22) Filed: Jan. 24, 2023

(65) Prior Publication Data

US 2023/0412713 A1 Dec. 21, 2023

Related U.S. Application Data

(60) Provisional application No. 63/353,345, filed on Jun. 17, 2022.

(51) Int. Cl.
*H04L 29/06* (2006.01)
*H04L 9/32* (2006.01)
*H04L 69/00* (2022.01)

(52) U.S. Cl.
CPC ............ *H04L 69/26* (2013.01); *H04L 9/3268* (2013.01); *H04L 9/3271* (2013.01)

(58) Field of Classification Search
CPC ...... H04L 69/26; H04L 9/3271; H04L 9/3268
USPC .......................................................... 713/156
See application file for complete search history.

(56) References Cited

U.S. PATENT DOCUMENTS

| | | | |
|---|---|---|---|
| 2009/0070512 A1 | 3/2009 | Narad | |
| 2010/0042708 A1 | 2/2010 | Stamler et al. | |
| 2013/0117766 A1* | 5/2013 | Bax | G06F 9/4401 |
| | | | 719/323 |
| 2013/0195105 A1* | 8/2013 | Basso | H04L 45/02 |
| | | | 370/389 |
| 2013/0259037 A1* | 10/2013 | Natarajan | H04L 12/465 |
| | | | 370/390 |
| 2014/0006672 A1 | 1/2014 | Das et al. | |

(Continued)

*Primary Examiner* — William J. Goodchild
*Assistant Examiner* — Samuel Ambaye
(74) *Attorney, Agent, or Firm* — Lee & Hayes, P.C.

(57) ABSTRACT

This disclosure describes techniques for interoperability of a blade server in a server chassis, where IOMs of the server chassis do not provide dedicated pins for communicating a physical slot ID to the blade server. BMCs of the blade servers and CMCs of IOMs of the server chassis are mutually configured to broadcast Ethernet frames on layer 2 network segments over a broadcast domain configured by a switch module connected to the blade servers over layer 2 network segments; conduct a slot inference communication protocol using these Ethernet frame broadcasts to enable the CMC to determine a physical slot ID in response to a BMC request, and broadcast that physical slot ID back to the BMC; and use a public certificate-private certificate pair, based in a hardware root of trust, to enforce security of this communication protocol.

17 Claims, 6 Drawing Sheets

(56) References Cited

U.S. PATENT DOCUMENTS

| | | | |
|---|---|---|---|
| 2014/0149658 A1* | 5/2014 | Boyd | G06F 3/0689 |
| | | | 711/112 |
| 2014/0258585 A1 | 9/2014 | Jovanovich et al. | |
| 2015/0248315 A1* | 9/2015 | Ragupathi | H04L 41/40 |
| | | | 709/226 |
| 2018/0167262 A1* | 6/2018 | Devarajan | H04L 41/0668 |
| 2018/0367870 A1* | 12/2018 | Shih | H05K 7/1498 |
| 2021/0274426 A1* | 9/2021 | Grayson | H04M 15/60 |
| 2022/0311624 A1* | 9/2022 | Herrero | H04L 63/0428 |

* cited by examiner

COMMUNICATION PROTOCOL FOR INFERENCE OF PHYSICAL SLOT IDENTIFIER BY BASEBOARD MANAGEMENT CONTROLLER OF BLADE SERVER

CROSS REFERENCE TO RELATED APPLICATIONS

This application claims priority to U.S. Provisional Patent Application No. 63/353,345, filed Jun. 17, 2022, the entire contents of which are incorporated herein by reference.

TECHNICAL FIELD

The present disclosure relates generally to interoperability of a blade server in a server chassis, where I/O modules ("IOMs") of the server chassis do not provide dedicated pins for communicating a physical slot identifier ("ID") to the blade server.

BACKGROUND

Blade servers are modular computing servers which include minimal components such as one or more processors, memory, and a network controller, housed in a compact form factor. Blade servers are configured to be installed in any of multiple uniquely identified physical slots of a server chassis, and to communicate with a server chassis over couplings by one or more ports and some number of connector pins to a backplane of the server chassis. Each blade server is further configured to send and receive data packet traffic over an Ethernet interface to the chassis backplane, where data packets from each blade server are forwarded over one or more networks by one or more switches of the server chassis.

Chassis backplanes are configured to provide connector pins to distribute power to blade servers, to exchange data with blade servers, and for various other functions as defined by server chassis manufacturers. Because each connector pin provides a dedicated communication function between a chassis backplane and a blade server, connector pins are a resource limited by their finite numbers. In server chassis design, functions of connector pins, whether for power distribution, data exchange, or other purposes, are integrated into printed circuit board designs at the discretion of hardware architects and designers to optimize computing performance. Consequently, a function which is not serviced by a connector pin of a chassis backplane may remain unavailable for blade servers installed in such a server chassis.

Data center architectures commonly include many blade servers installed in many server chassis, and each blade server must communicate with other networks through the Internet Protocol ("IP") infrastructure of the data center. To achieve this, the data center must provide a network infrastructure which includes IP switching functionality for each blade server. The configuration of a server chassis to perform IP switching for blade servers requires each blade server to obtain an identification of the physical slot (the "physical slot ID" or "slot ID") in which that blade server is installed. Thus, conventional chassis backplanes have been designed to provide a dedicated connector pin for communicating a physical slot ID to an installed blade server.

However, as computational and data transport needs for data centers continue to grow, backplane designers increasingly cannot afford to dedicate connector pins to merely communicating a physical slot ID. As new server chassis models discontinue the availability of slot ID pins, data center administrators face a need for blade servers to obtain physical slot IDs without communicating with slot ID pins.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes a communication protocol between a blade server and a server chassis for inference of a physical slot ID of a physical slot of a server chassis IOM where the blade server is installed.

A method includes comparing, receiving, by a chassis management controller ("CMC") of a server chassis, a request frame broadcast over a broadcast domain from a baseboard management controller ("BMC") of a blade server installed in the server chassis; sending, by the CMC, a MAC address of the BMC over an out-of-band pathway to a switch module connected to the CMC by a network segment; receiving, by the CMC, a port interface from the switch module over the out-of-band pathway; determining, by the CMC, a physical slot ID corresponding to the port interface; and broadcasting, by the CMC, a response frame over the broadcast domain.

The method further includes periodically broadcasting, by the CMC, an echo frame over the broadcast domain. The method further includes determining, by the CMC, based on the port interface, whether the MAC address has been duplicated at more than one port interface; and blocking, by the CMC, for multiple port interfaces corresponding to a duplicated MAC address, network traffic from all but one of the multiple port interfaces.

Additionally, another method includes broadcasting, by a baseboard management controller ("BMC") of a blade server installed in a server chassis, a request frame over a broadcast domain configured by a switch module; receiving, by the BMC, a response frame broadcast over the broadcast domain by a chassis management controller ("CMC") of the server chassis; and parsing, by the BMC, a Type-Length-Value ("TLV") sequence encoding a physical slot ID from the response frame.

The method further includes requesting, by the BMC, a public cryptographic certificate of each CMC of the server chassis; and verifying, by the BMC, that the public cryptographic certificate includes a subject line which contains an identifier string, the identifier string designating that the public certificate originates from a model of I/O module ("TOM") which does not provide a dedicated pin for communicating a physical slot ID to the blade server. The method further includes receiving, by the BMC, up to two response frames broadcast from two CMCs of a same server chassis, each response frame including a TLV sequence encoding a certificate-signed challenge string hash; decrypting, by the BMC, the certificate-signed challenge string hash using a public key of a public cryptographic certificate of the server chassis, and comparing, by the BMC, the decrypted challenge string hash against a challenge string hash generated by the BMC. The method further includes determining, by the BMC, that two physical slot IDs parsed from two response frames of two CMCs are the same physical slot ID, and requesting, by the BMC, the two CMCs to each delete a MAC address of the BMC from a MAC address table.

Additionally, the techniques described herein may be performed by a system and/or device having non-transitory computer-readable media storing computer-executable instructions that, when executed by one or more processors, performs the methods described above.

EXAMPLE EMBODIMENTS

According to example embodiments of the present disclosure, blade servers are installed in any number of physical slots of a backplane of a server chassis, and a server chassis is in communication with a switch module. By way of example, a server chassis can include an integrated switch module. Such a server chassis having blade servers installed can be configured as one of any number of server chassis components of an access layer network infrastructure, or an edge layer network infrastructure, of a multi-tier data center infrastructure architecture.

Data traffic in the form of packets can be carried over one or more network segments established between some number of ports of network devices. In a data center infrastructure architecture, such network segments can be categorized as, for example, layer 2 network segments and layer 3 network segments according to the Open Systems Interconnection ("OSI") model. According to Ethernet implementations, Internet Protocol ("IP") packets are encapsulated as frames and forwarded over one or more layer 2 network segments and layer 3 network segments. While generally frames are forwarded by switches over layer 2 network segments while forwarded by routers over layer 3 network segments, in a data center infrastructure architecture, switches perform forwarding over both layer 2 and layer 3 network segments.

It should be understood that a multi-tier data center architecture includes a combination of any number of underlying network devices which are configured to transport data packets according to decision-making logic of Ethernet implementations, including switches as described above. By way of example, network devices generally forward data packets according to next-hop forwarding. In next-hop forwarding, an ASIC of a network device, configured by computer-executable instructions, may evaluate, based on routing table information, a next-hop forwarding destination of a data packet received on an inbound network interface of a network device; and may forward the data packet over a network segment to the determined destination over an outbound network interface of the network device.

Figure 1:
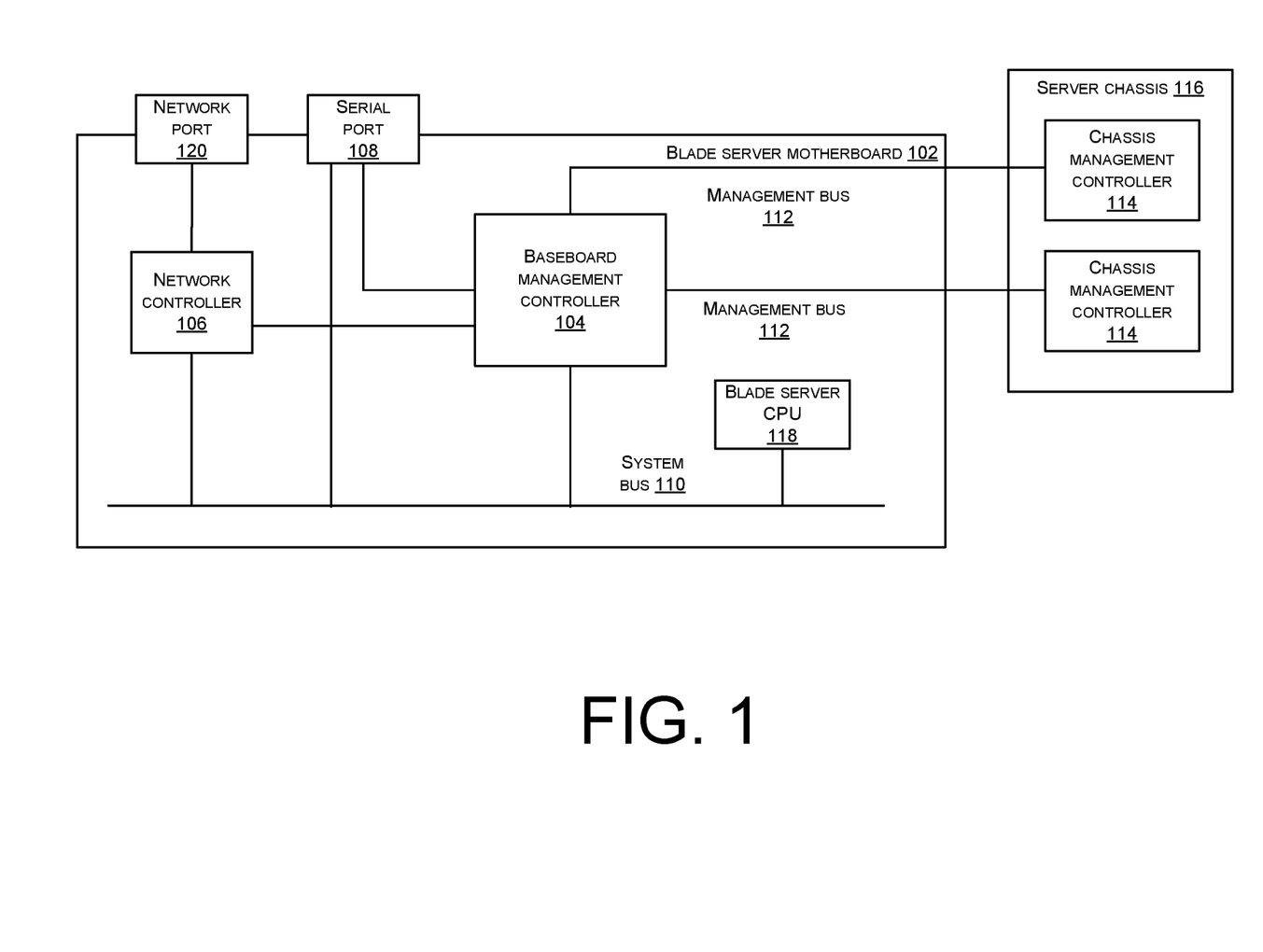
FIG. 1 illustrates a schematic layout of a blade server motherboard, a server chassis, and a switch module.

FIG. 1 illustrates a schematic layout of a blade server motherboard, a server chassis, and a switch module. The blade server motherboard 102 includes at least a baseboard management controller ("BMC") 104 and a network controller 106. A BMC 104 includes a microcontroller, i.e., an integrated circuit composed of at least one or more central processing units, memory, some number of input/output ("I/O") pins, and an analog-to-digital converter ("ADC"). A BMC 104 is configured by one or more sets of computer-readable instructions stored on a computer-readable storage medium to perform computations.

It should be understood that a BMC 104 constitutes a first computing system contained within the blade server, which constitutes a second computing system. Central processing units, memory, and I/O pins of the BMC 104 (not illustrated, but which should be understood as being encompassed by the BMC 104 in FIG. 1) are independent from central processing units, memory, and I/O pins of the blade server motherboard 102 (not illustrated, except for the blade server CPU 118 as described subsequently, but which should be understood as being encompassed by the blade server motherboard 102). The BMC 104 and its elements are powered by a power source of the blade server; however, the BMC 104 is configured by firmware to perform computations independent of the blade server and independent of any elements of the blade server.

I/O pins of the BMC 104 are in electronic communication with a chipset of a blade server motherboard 102, the chipset providing a plurality of connector pins, including connector pins configured to draw power from blade servers, to exchange data with blade servers, and for various other functions as defined by blade server manufacturers.

I/O pins of a BMC 104 are further in electronic communication with other elements of a blade server motherboard 102, which include the network controller 106, as well as elements such as a serial port 108, any number of data buses, and any number of integrated circuits. The BMC 104, in conjunction with these elements of a blade server motherboard 102, is configured as an autonomous management subsystem of the blade server 102. The BMC 104 is configured to provide interfaces which control the configuration and operation of the blade server, based on computing inputs from the network controller 106, a serial port 108, data buses, integrated circuits, and the like. Such inputs can be processed at interfaces of the BMC 104 provided in accordance with a systems-management specification, such as Intelligent Platform Management Interface ("IPMI").

The data buses can include a system bus 110 of the blade server motherboard 102. The system bus 110 is a data bus connecting a central processing unit ("CPU") of the blade server motherboard 102 (a "blade server CPU 118") and memory of the blade server CPU 118, as well as connecting the blade server CPU 118 with other elements of the blade server motherboard 102, including the BMC 104, the network controller 106, and the serial port 108, in electronic communication.

The data buses can further include any number of management buses 112 (such as, by way of example, a system management bus ("SMBus"), a management data input/output ("MDIO") bus, an Intelligent Platform Management Bus ("IPMB"), an Intelligent Platform Management Controller ("IPMC") bus, and other such data buses which are narrower in bandwidth than the system bus 110).

Each such data bus should be understood as an electronic communication interface which provides electronic communication between a CPU of the BMC 104 and other elements of the BMC; between the BMC 104 and a chassis management controller ("CMC") 114 of a server chassis 116; and/or between the BMC 104 and a computing system external to the server chassis 106 (such as a local computing system physically interfaced with the serial port 108, or a remote computing system interfaced with the network controller 106 by an Ethernet connection; not illustrated). An external computing system can be operated by a server administrator by one or more input interfaces of the remote computing system.

It should be understood that a CMC 108 constitutes a third computing system contained within the server chassis. The CMC 108 further includes central processing units, memory, and I/O pins (not illustrated, but which should be understood as being encompassed by the CMC 108 in FIG. 1). The CMC 108 and its components are powered by a power source of the server chassis; however, the CMC 108 is configured by firmware to perform computations independent of any elements of the server chassis.

It should further be understood that a CMC is a component of an I/O module ("IOM") of a server chassis, and that each server chassis can include two IOMs which are redundant to each other in functionality. Therefore, two IOMs of a server chassis can provide two CMCs, where both CMCs are in electronic communication with the BMC 104, and both CMCs are configured substantially similarly. Subsequently, it should be understood that a CMC as described herein can refer to either CMC of a server chassis interchangeably, except where both CMCs of a server chassis are referenced together; any steps described subsequently as being performed by a CMC can be performed substantially similarly by one or both CMCs of a server chassis. For simplicity, FIG. 1 illustrates only one CMC of the server chassis rather than both.

I/O pins of the CMC 108 are in electronic communication with a chipset of a server chassis board 116, the chipset providing a plurality of connector pins, including connector pins configured to draw power from the server chassis, to exchange data with components of the server chassis, and for various other functions as defined by server chassis manufacturers.

I/O pins of a CMC 108 are further in electronic communication with other elements of a server chassis board 116, which include a server chassis network controller, as well as elements such as any number of data buses and any number of integrated circuits. The CMC 108, in conjunction with these elements of a server chassis, is configured as an autonomous management subsystem of the server chassis. The CMC 108 is configured to provide interfaces which control the configuration and operation of the server chassis, based on computing inputs from the network controller, data buses, integrated circuits, and the like. Such inputs can be processed at interfaces of the CMC 108 provided in accordance with a systems-management specification, such as Intelligent Platform Management Interface ("IPMI").

A BMC 104 and a CMC 108 can be connected in electronic communication by a management bus 112 of a blade server motherboard 102 which interconnects with a server chassis board 116. A BMC 104 and an external computing system can be connected in electronic communication by a management bus 112 of a blade server motherboard 102 which interconnects with a network controller 106 or a serial port 108. Moreover, a BMC 104 and an external computing system can be connected in electronic communication by a system bus 110.

Thus, the BMC 104 can be connected in electronic communication to an external computing system by more than one pathway; for the purpose of understanding example embodiments of the present disclosure, a connection by a system bus 110 is generally distinguished as an "in-band," and a connection by any other lower-bandwidth pathway, such as a management bus 112 or an I/O pin, is generally distinguished as "out-of-band" or "side-band."

A BMC 104 can be connected to any number of sensors, such as temperature sensors, fan speed sensors, voltage sensors, and the like, by I/O pins and/or by management buses 112. The BMC 104 can be configured by firmware to receive measurements from such sensors, and to report the received measurements to an external computing system as described above. Such measurements can indicate status, performance, health, and such characteristics of the blade server or elements thereof. In this fashion, an external computing system is configured to receive and report sensor measurements collected by the BMC 104. A server administrator operating the external computing system can review the sensor measurements, determine status, performance, health, and such characteristics of the blade server, and send inputs to the BMC 104 over a management bus 112 to configure elements of the blade server to perform various tasks, thereby adjusting status, performance, health, and such characteristics of the blade server without necessarily physically accessing the blade server.

Such out-of-band or side-band configuration of a blade server by an external computing system over a management bus 112 enables the BMC 104 to configure a blade server CPU 118 before the blade server has booted, enables the BMC 104 to configure a blade server CPU 118 before any operating system has been installed on the blade server, and enables the BMC 104 to configure a blade server CPU 118 in the event that the blade server is not powered due to a failure or for servicing, but is supplying power to the BMC 104.

Likewise, a CMC 108 can be connected in electronic communication to an external computing system by in-band or out-of-band pathways, and can be connected to any number of sensors of the server chassis board 116. For example, an out-of-band pathway such as an MDIO bus can connect the CMC 108 to the switch module, enabling the CMC 108 to send Ethernet frames to request information from the switch module and receive information from the switch module in Ethernet frames.

Furthermore, the network controller 106 connects the blade server CPU 118 and the BMC 104 in communication with a network port 120. In a network device as a whole, transceiver integrated circuits underlying the sending and receiving functionality of ports according to network standards, such as local area network ("LAN") standards, may be each referred to as a physical layer circuit, commonly referred to as an "Ethernet PHY" or "PHY." The physical circuit design of each PHY may determine characteristics of a respective port of a network device, such as a bitrate of each respective port and the LAN standards which each respective port may support in sending and receiving packets. Subsequently, for ease of reference, a "port" according to example embodiments of the present disclosure shall refer to one or more integrated circuits of a PHY which define transceiver functionalities of a respective port of a network device.

In one respect, the BMC 104 can configure the blade server CPU 118 to encapsulate Ethernet frames according to a network protocol, and cause the network controller 108 to forward encapsulated Ethernet frames over one or more network segments from the network port 120. For example, the blade server CPU 118 can be configured to encapsulate an Ethernet frame with an Ethernet header containing a destination MAC address, a source MAC address, and an EtherType, the EtherType including some number of bits which encode an indication of a network protocol. The blade server CPU 118 can be configured to send an Ethernet frame encapsulated with an Ethernet header from the network port 120 to a switch module for forwarding over a layer 2 network segment. Such Ethernet frames can be addressed to a broadcast domain (as shall be described subsequently), or can be addressed to a network device in another network domain (such as the Internet).

Furthermore, the blade server CPU 118 can be configured to further encapsulate an Ethernet frame with a network layer header containing a destination IP address and a source IP address. The blade server CPU 118 can be configured to send an Ethernet frame encapsulated with a network layer header from the network port 120 to a switch module for forwarding over a layer 3 network segment.

A switch module can be integrated into a server chassis or installed in a server chassis, and can be configured to forward Ethernet frames sent from network ports of multiple blade servers. Since multiple blade servers are installed in different physical slots of a server chassis, and blade servers can be hot-swapped between different physical slots of different server chassis (causing the BMC to immediately boot up, even before the blade server itself has booted), from the perspective of a blade server, the physical slot where the blade server is installed is not necessarily known at any given time.

Likewise, a CMC 108 is connected in communication with a network port of the server chassis, and the CMC 108 is configured to forward encapsulated Ethernet frames over one or more network segments from the network port of the server chassis to the switch module. Such Ethernet frames can be addressed to a broadcast domain (as shall be described subsequently), or can be addressed to a network device in another network domain (such as the Internet).

In the course of the BMC 104 configuring a blade server CPU 118, the blade server may, at any time, be freshly swapped into a physical slot and may be freshly booting, without any stored information identifying the physical slot (the "physical slot ID" or "slot ID") in which that blade server is installed. A booting blade server cannot determine its own physical slot ID; therefore, the BMC 104 needs to determine the physical slot ID where the blade server is installed, in the stead of the blade server CPU 118.

Therefore, for the purpose of the BMC configuring a blade server CPU, where the blade server is installed in a server chassis which does not provide a dedicated pin for communicating a physical slot ID to the blade server, example embodiments of the present disclosure provide a communication protocol between a blade server and a server chassis for inference of a physical slot ID (subsequently, a "slot inference communication protocol" between a blade server and a server chassis).

A slot inference communication protocol includes an exchange of Ethernet frames between a BMC of a blade server and a CMC of a server chassis over a management bus, where the blade server is installed in any physical slot of the server chassis. It should be understood that an exchange of Ethernet frames between the BMC and the CMC is performed by broadcast of Ethernet frames from the BMC and broadcast of Ethernet frames from the CMC over a broadcast domain.

A broadcast domain is a logically defined network domain which encompasses some number of layer 2 network segments, where any network device of the broadcast domain can broadcast Ethernet frames to all other network devices of the broadcast domain (i.e., send a data packet which is replicated and addressed to all other network devices of the network domain). Whereas network devices can logically define broadcast domains by several fashions, for the purpose of example embodiments of the present disclosure, it should be understood that a CMC configures a broadcast domain by causing the switch module to configure a virtual local area network ("VLAN") which includes each layer 2 network segment connected to the switch module.

By way of example, the CMC can cause the switch module to configure a default VLAN. In this fashion, blade servers connected to the switch module by a network segment can be configured to broadcast on a default VLAN to perform steps of a slot inference communication protocol, without further configuration to broadcast on a specific VLAN.

It should further be understood that, logically, Ethernet frames forwarded to a switch module configured as described above are transported within the broadcast domain if the Ethernet frames are tagged with a VLAN tag (i.e., Ethernet headers of the Ethernet frames at least further include a VLAN tag alongside the MAC address, the source MAC address, and the EtherType), where the VLAN tag identifies the VLAN configured by the switch module. Ethernet frames forwarded to the switch module are not transported within the broadcast domain if the Ethernet frames are not tagged with a VLAN tag.

Furthermore, according to example embodiments of the present disclosure, Ethernet frames forwarded to a switch module as configured above include a variable-length data payload, which is encapsulated in an Ethernet header, wherein an EtherType of the Ethernet header includes bits indicating a novel network protocol, i.e., the slot inference communication protocol as described herein. For the purpose of understanding example embodiments of the present disclosure, it should be understood that the EtherType should not match any published EtherType corresponding to conventional network protocols as of the date of this filing. By way of example, an EtherType according to example embodiments of the present disclosure does not correspond to conventional network protocols such as IPv4, IPv6, ARP, and the like, as well as published proprietary network protocols to date.

According to example embodiments of the present disclosure, the above-mentioned Ethernet frame has a length of no greater than 1500 bytes, where the variable length of the data payload does not exceed 1450 bytes. Furthermore, with reference to the steps of a slot inference communication protocol as subsequently described, information forwarded by either the BMC or the CMC within any one step can be entirely stored within a single variable-length data payload of a single Ethernet frame as described above, without encompassing more than one Ethernet frame.

The variable-length data payload can include one or more sequences structured according to Type-Length-Value ("TLV") format. A TLV format may generally refer to any encoding format which encodes a value for a particular type of field, where the type of the field is encoded in a type field, the length of the value is encoded in a length field, and the value is encoded in a value field.

A TLV sequence according to example embodiments of the present disclosure can include a type field of sufficient length to encode at least nine distinct types, as well as any arbitrary number of other distinct types. By way of example, a type field can include at least four bytes, permitting encoding of several orders of magnitude of additional distinct types. Each distinct value indicates that the value field carries a different kind of message defined according to a slot inference communication protocol as described herein.

A TLV sequence according to example embodiments of the present disclosure includes a length field of sufficient length to encode a length of the value field in bits.

A TLV sequence according to example embodiments of the present disclosure includes a value field of sufficient length to encode various information to be forwarded to the CMC from the BMC, or to the BMC from the CMC, as described below with reference to FIGS. 2 and 3.

According to the slot inference communication protocol as described herein, a first distinct type of the TLV sequence can indicate that the value field of the TLV sequence encodes a transaction ID. The BMC and the CMC can be configured to read a transaction ID from an Ethernet frame to distinguish different exchanges of Ethernet frames according to the slot inference communication protocol. A data payload of each Ethernet frame according to the slot inference communication protocol can include a TLV sequence encoding a transaction ID.

According to the slot inference communication protocol as described herein, a second distinct type of the TLV sequence can indicate that the value field of the TLV sequence encodes a message category. The value field of the TLV sequence can encode at least three different message categories: a request, a response, or an echo, as shall be described in further detail subsequently. A data payload of each Ethernet frame according to the slot inference communication protocol can include a TLV sequence encoding a message category.

According to the slot inference communication protocol as described herein, a third distinct type of the TLV sequence can indicate that the value field of the TLV sequence encodes a chassis ID. A data payload of each Ethernet frame according to the slot inference communication protocol may or may not include a TLV sequence encoding a chassis ID, depending on whether the CMC has yet broadcast a chassis ID in response to a request from a BMC, as shall be described subsequently.

According to the slot inference communication protocol as described herein, a fourth distinct type of the TLV sequence can indicate that the value field of the TLV sequence encodes a physical slot ID. The BMC broadcasts an Ethernet frame, a data payload of the Ethernet frame including a TLV sequence encoding a request category (a "request frame"), causing the CMC to later broadcast a response which includes the physical slot ID, as shall be described subsequently; thus, a data payload of an Ethernet frame of a response category (subsequently, a "response frame") according to the slot inference communication protocol can include a TLV sequence encoding a physical slot ID.

According to the slot inference communication protocol as described herein, a fifth distinct type of the TLV sequence can indicate that the value field of the TLV sequence encodes an error code. A data payload of each Ethernet frame according to the slot inference communication protocol can include a TLV sequence encoding an error code indicating non-error or indicating an error. Non-error indicates that another TLV sequence of the same Ethernet frame successfully encodes all value(s) according to its type. An error indicates that another TLV sequence of the same Ethernet frame unsuccessfully encodes some or all value(s) according to its type.

According to the slot inference communication protocol as described herein, a sixth distinct type of the TLV sequence can indicate that the value field of the TLV sequence encodes an echo counter. A data payload of an Ethernet frame of an echo category (subsequently, an "echo frame") according to the slot inference communication protocol can include a TLV sequence encoding an echo counter, which is a numeric counter which monotonically increases for each subsequent echo frame. A CMC periodically broadcasts echo frames across the broadcast domain; according to the slot inference communication protocol, no network device of the broadcast domain responds to an echo frame.

According to the slot inference communication protocol as described herein, a seventh distinct type of the TLV sequence can indicate that the value field of the TLV sequence encodes a challenge string. A data payload of each Ethernet frame according to the slot inference communication protocol can include a TLV sequence encoding a challenge string. Challenge strings can originate from a request frame broadcast by a BMC to secure message exchanges of the slot inference communication protocol, as shall be described subsequently.

According to the slot inference communication protocol as described herein, an eighth distinct type of the TLV sequence can indicate that the value field of the TLV sequence encodes a certificate-signed challenge string hash. A CMC can generate a certificate-signed challenge string hash using a private certificate of the CMC, and broadcast the certificate-signed challenge string hash in a data payload of a response frame, as shall be described subsequently.

According to the slot inference communication protocol as described herein, a ninth distinct type of the TLV sequence can indicate that the value field of the TLV sequence encodes a public certificate of a CMC. The public certificate of a CMC corresponds to a private certificate of the CMC as described above.

By way of example, a private certificate and a public certificate of a CMC can be cryptographic certificates implemented according to elliptic curve cryptography ("ECC"). These ECC certificates configure one or more processing units of a computing system to encrypt data using a private key of the private certificate, and decrypt the encrypted data using a public key of the public certificate.

It should be understood that, while the type field of the TLV sequence includes sufficient bytes to define several orders of magnitude more distinct types, for the purpose of understanding example embodiments of the present disclosure, it is not necessary for a slot inference communication protocol to define additional distinct types.

For understanding example embodiments of the present disclosure, it should be understood that a BMC and a CMC configured according to example embodiments of the present disclosure, after broadcasting any Ethernet frame described in any of the subsequently described steps of a physical slot inference protocol (a "current broadcast"), wait for a nominal timeout period (which can be approximately three seconds in length) to receive the next Ethernet frame broadcast (an "expected broadcast") as described according to the protocol. In the event that the expected broadcast is not received during the timeout period (whether no broadcast was received or a non-expected broadcast was received), the BMC and the CMC are both, respectively, configured to retry the current broadcast indefinitely until the expected broadcast is received.

It should be further understood that a BMC and a CMC configured according to example embodiments of the present disclosure, after receiving any Ethernet frame broadcast described in any of the subsequently described steps of a physical slot inference protocol, are both, respectively, configured to parse each TLV sequence included in the variable-length data payload. The BMC and the CMC may, or may not, successfully parse each TLV sequence. In the event that the BMC or the CMC fails to parse any one TLV sequence of an Ethernet frame, the BMC and the CMC, respectively, may record the failure in an error log, but continue to parse subsequent TLV sequences of the Ethernet frame and continue to perform the steps of the physical slot inference protocol as described subsequently without aborting the steps of the physical slot inference protocol.

Figure 2A:
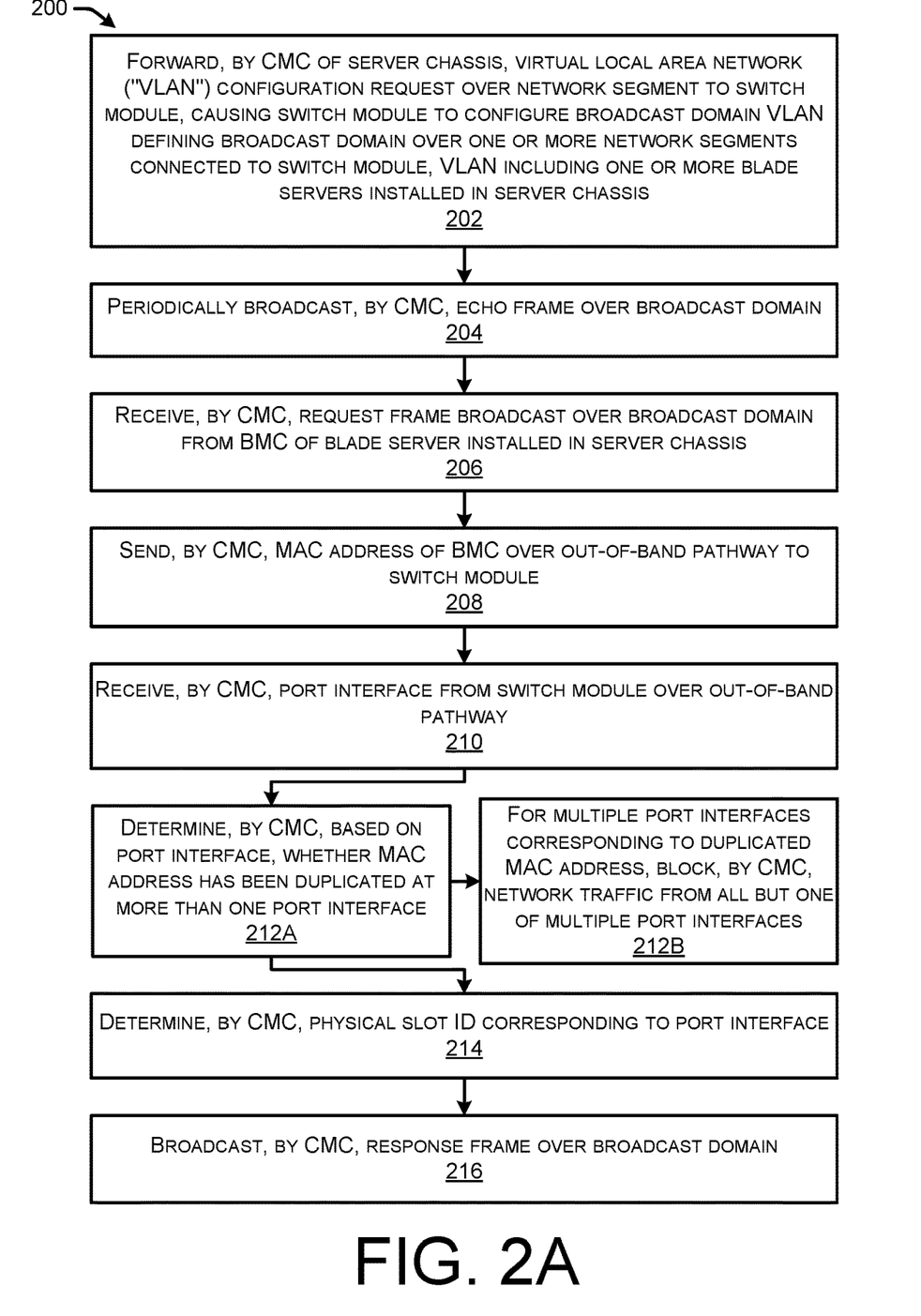
FIGS. 2A and 2B illustrate a CMC-side physical slot inference protocol according to example embodiments of the present disclosure.
Figure 2B:
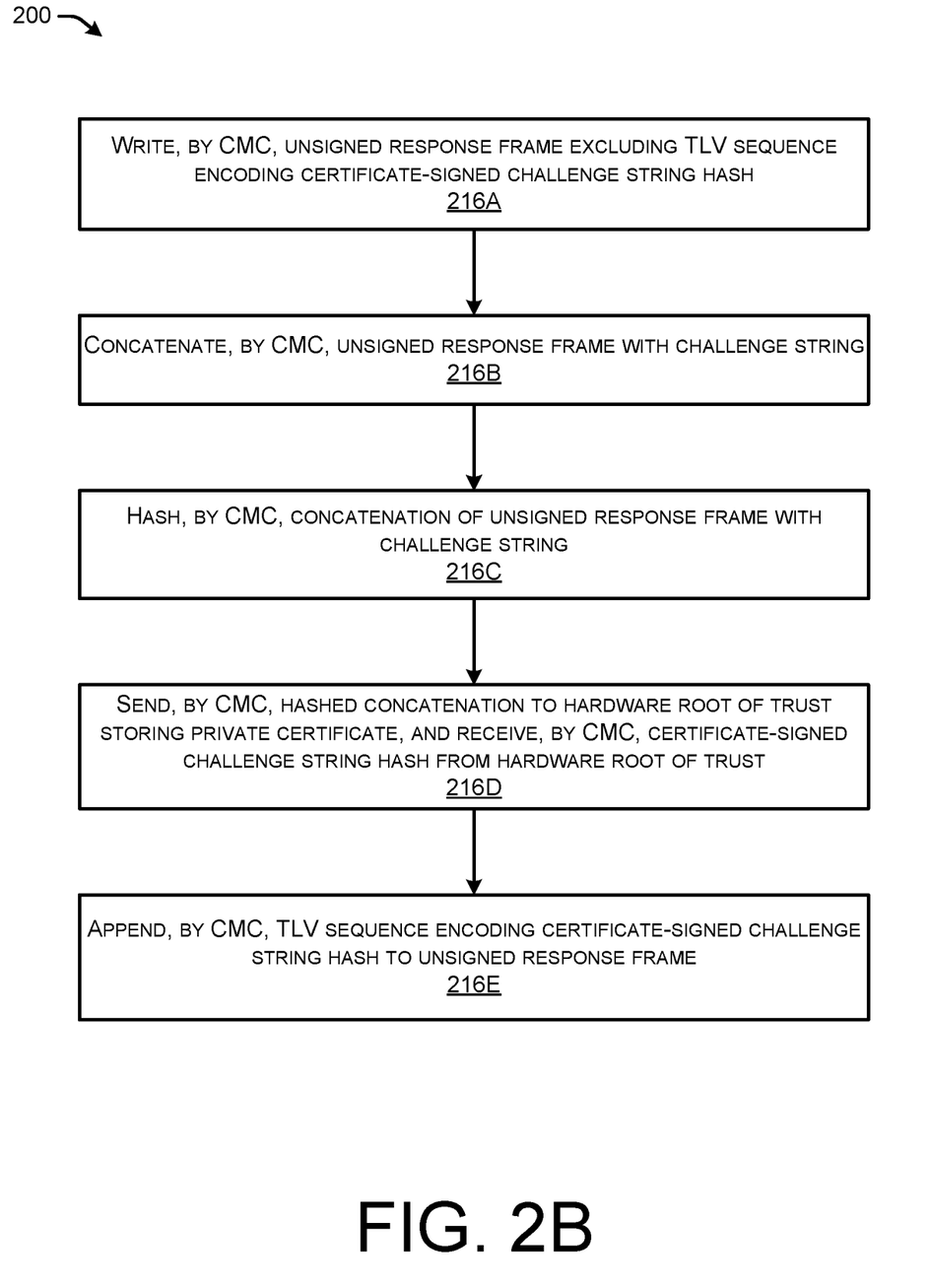

FIGS. 2A and 2B illustrate a CMC-side physical slot inference protocol 200 according to example embodiments of the present disclosure. The steps of the CMC-side physical slot inference protocol 200 are performed by a CMC of a server chassis (which, as described above, can be either one of two CMCs of the same server chassis), exchanging data link layer (i.e., OSI layer 2) Ethernet frames with a BMC of a blade server installed in the server chassis, over a management bus 112; and exchanging data link layer packets and Ethernet frames with a switch module which can be integrated into the server chassis, or can be non-integrally connected to the server chassis.

At a step 202, a CMC of a server chassis forwards a virtual local area network ("VLAN") configuration request over a network segment to a switch module, causing the switch module to configure a broadcast domain VLAN defining a broadcast domain over one or more network segments connected to the switch module, the VLAN including one or more blade servers installed in the server chassis.

As described above, a CMC of a server chassis is connected in communication by a network controller of the server chassis with a network port of the server chassis, and the CMC is configured to forward encapsulated Ethernet frames over one or more network segments from the network port of the server chassis to the switch module.

The VLAN configuration request causes the switch module to configure a VLAN which defines a broadcast domain over one or more network segments connected to the switch module (subsequently a "broadcast domain VLAN"), the broadcast domain VLAN being identified by a particular VLAN tag. The CMC configures a broadcast domain by causing the switch module to configure a VLAN which includes each layer 2 network segment connected to the switch module. Thus, all subsequent Ethernet frames forwarded over one or more (layer 2) network segments to the switch module which include a VLAN tag, the VLAN tag identifying the broadcast domain VLAN, are forwarded to all network devices of the broadcast domain, and are not forward to any network devices not defined as part of the broadcast domain.

After the broadcast domain VLAN is configured, a BMC can perform BMC-side steps of a physical slot inference protocol 300 as described below by broadcasting Ethernet frames to network devices of the broadcast domain, with reference to FIG. 3A.

At a step 204, the CMC periodically broadcasts an echo frame over the broadcast domain.

As described above, an echo frame according to the slot inference communication protocol is an Ethernet frame, where a data payload of the Ethernet frame includes a TLV sequence encoding an echo counter, which is a numeric counter which monotonically increases for each subsequent echo frame. A CMC periodically broadcasts echo frames across the broadcast domain; according to the slot inference communication protocol, no network device of the broadcast domain responds to an echo frame.

The CMC can periodically broadcast the echo frame at intervals of several seconds in duration, such as intervals of ten seconds each.

At a step 206, the CMC receives a request frame broadcast over the broadcast domain from a BMC of a blade server installed in the server chassis.

As described above, and described in further detail subsequently with reference to FIG. 3A, a request frame according to the slot inference communication protocol is an Ethernet frame, where a data payload of the Ethernet frame includes a TLV sequence encoding a request category, and includes a TLV sequence encoding a challenge string. After forwarding this request frame, an expected broadcast by the BMC is a response frame broadcast by the CMC over the broadcast domain, the response frame having a data payload which includes a TLV sequence which encodes a physical slot ID. In the event that the expected broadcast is not received during a timeout period as described above, the BMC is configured to retry the current broadcast indefinitely (i.e., retry broadcasting the request frame) until the expected broadcast is received from the CMC.

The CMC is configured to parse the request frame, whereupon it may read, from the data payload of the request frame, a TLV sequence encoding a request category, and a TLV sequence encoding a challenge string. In response to successfully parsing and reading these TLV sequences, the CMC is configured to perform step 208.

At a step 208, the CMC sends a MAC address of the BMC over an out-of-band pathway to the switch module.

As described above, the request frame received from the BMC was encapsulated in an Ethernet header which included a source MAC address. Thus, the CMC can obtain the MAC address from the request frame and send the MAC address to the switch module.

It should be understood that the MAC address of the BMC is sent over an out-of-band pathway, such as an MDIO bus or any other serial management bus, rather than a network segment.

It should be understood that a switch is configured to (for the purpose of enforcing, for example, access control lists ("ACLs")) store a MAC address table for network devices, such as blade servers, which are reachable over one or more layer 2 network segments connected to the switch. A MAC address table stored by a switch includes a series of records, each record including at least a MAC address and a corresponding network port interface, where the switch forwards packets addressed to the MAC address to that corresponding network port interface. It should be understood that as MAC addressing takes place over layer 2 network segments, network port interfaces can refer to the sequential numbering of PHYs of an IOM of a server chassis (which are, in turn, mapped to individual blade servers installed in physical slots and connected to those PHYs), or the sequential numbering of PHYs of the switch, which correspond to the sequential numbering of PHYs of an IOM (for example, in the event that the IOM passes through network connections from PHYs of the IOM to PHYs of the switch). Therefore, network port interfaces do not refer to "port numbers" as logically defined by network protocols such as TCP and UDP at higher OSI layers than layer 2.

It should be understood that some models of switch modules can return a bit vector instead of a number to indicate a corresponding network port interface, where different bit vectors indicate different network port interfaces. For the purpose of understanding example embodiments of the present disclosure, bit vectors returned from a switch module should be understood as equivalent to network port interface numbers returned from a switch module.

Based on this MAC address table, upon receiving a request including a MAC address of a BMC, the switch module is configured to look up the MAC address of the BMC in the MAC address table, retrieve a corresponding network port interface, and return the corresponding network port interface to the CMC over the out-of-band pathway.

At a step 210, the CMC receives a port interface from the switch module over the out-of-band pathway.

At a step 212A, the CMC determines, based on the port interface, whether the MAC address has been duplicated at more than one port interface.

As each individual blade server is not aware of each other blade server, it is possible for BMCs of different blade servers to configure duplicate MAC addresses. The CMC can detect duplication of MAC addresses across more than one BMC by comparing, over time, whether sending the same MAC address to the switch module causes the same port interface or different port interfaces to be returned. The duplication of MAC addresses across more than one BMC results in the switch module overwriting the same record of a MAC address table with different port interfaces, over time.

Therefore, the CMC records mappings between previously sent MAC addresses and previously received port interfaces, and compares recorded mappings to pairings of newly sent MAC addresses and newly received port interfaces, to determine whether the same MAC address has caused the switch to return multiple different port interfaces.

It should be understood that, where some models of switch modules return a bit vector instead of a number to indicate a corresponding network port interface, the same MAC address causing the switch to return different bit vectors is equivalent to the same MAC address causing the switch to return different port interface numbers.

In the event that the MAC address has not been duplicated at more than one port interface (i.e., the same MAC address has not caused the switch to return multiple different port interfaces), step 212B subsequently is not performed, and the port interface is considered an unblocked port interface.

At a step 212B, for multiple port interfaces corresponding to a duplicated MAC address, the CMC blocks network traffic from all but one of the multiple port interfaces.

The CMC can block network traffic from a port interface by recording the port interface in a block list. By blocking network traffic from all but one of multiple port interfaces which correspond to a duplicated MAC address, the CMC can prevent the switch from inconsistently forwarding same-addressed packet traffic to different ports.

The CMC can choose which port interface(s) to block and which port interface remains unblocked according to, for example, a numerical order of port interfaces. The CMC can block all port interface(s) except for the port interface lowest in numerical order.

After the CMC blocks network traffic from all but one of the multiple port interfaces, the remaining port interface is considered an unblocked port interface.

At a step 214, the CMC determines a physical slot ID corresponding to the port interface.

Herein, it is assumed that the port interface is an unblocked port interface according to steps 212A and 212B above.

Integrated circuits of the IOM of the server chassis map physical slots to port interfaces. Therefore, the CMC can determine, by electrical connections of the IOM integrated circuit design, which port interface corresponds to which physical slot ID.

At a step 216, the CMC broadcasts a response frame over the broadcast domain.

As described above, a response frame according to the slot inference communication protocol is an Ethernet frame, where a data payload of the Ethernet frame includes a TLV sequence encoding a response category, includes a TLV sequence encoding a physical slot ID, and includes a TLV sequence encoding a certificate-signed challenge string hash. After broadcasting this response frame, the CMC does not expect any broadcasts by the BMC over the broadcast domain in the event that the BMC successfully receives the broadcast. (In the event that the BMC fails to receive the broadcast, the BMC is configured to retry broadcasting a request frame, as described in further detail subsequently with reference to FIG. 3A.) The CMC is configured to continue to periodically broadcast echo frames over the broadcast domain.

The CMC generates the certificate-signed challenge string hash by signing the challenge string received from the request frame using a private key of a private certificate of the CMC. The private certificate can be secured against tampering, counterfeiting, and other such security breaches by being stored on a hardware root of trust, such as an integrated circuit component of the CMC which cannot be rewritten.

According to an example embodiment of the present disclosure, the CMC can generate the certificate-signed challenge string hash according to the following steps:

At a step 216A, the CMC writes an unsigned response frame excluding a TLV sequence encoding a certificate-signed challenge string hash.

The CMC writes an unsigned response frame including all elements as described above, except for a TLV sequence encoding a certificate-signed challenge string hash, which is added in subsequent steps.

At a step 216B, the CMC concatenates the unsigned response frame with the challenge string.

The CMC can concatenate the unsigned response frame and the challenge string as a string operation in a data structure such as a string buffer.

At a step 216C, the CMC hashes the concatenation of the unsigned response frame with the challenge string.

The CMC can hash the concatenation by a one-way hash function, such as any of the SHA-2 set of cryptographic hash functions.

At a step 216D, the CMC sends the hashed concatenation to a hardware root of trust storing a private certificate, and receives a certificate-signed challenge string hash from the hardware root of trust.

The hardware root of trust is configured to sign the hashed concatenation using a private key of the private certificate, and return the certificate-signed challenge string hash to the CMC.

At a step 216E, the CMC appends a TLV sequence encoding the certificate-signed challenge string hash to the unsigned response frame.

The CMC can now broadcast the response frame over the broadcast domain, including a TLV sequence encoding a certificate-signed challenge string hash.

Figure 3A:
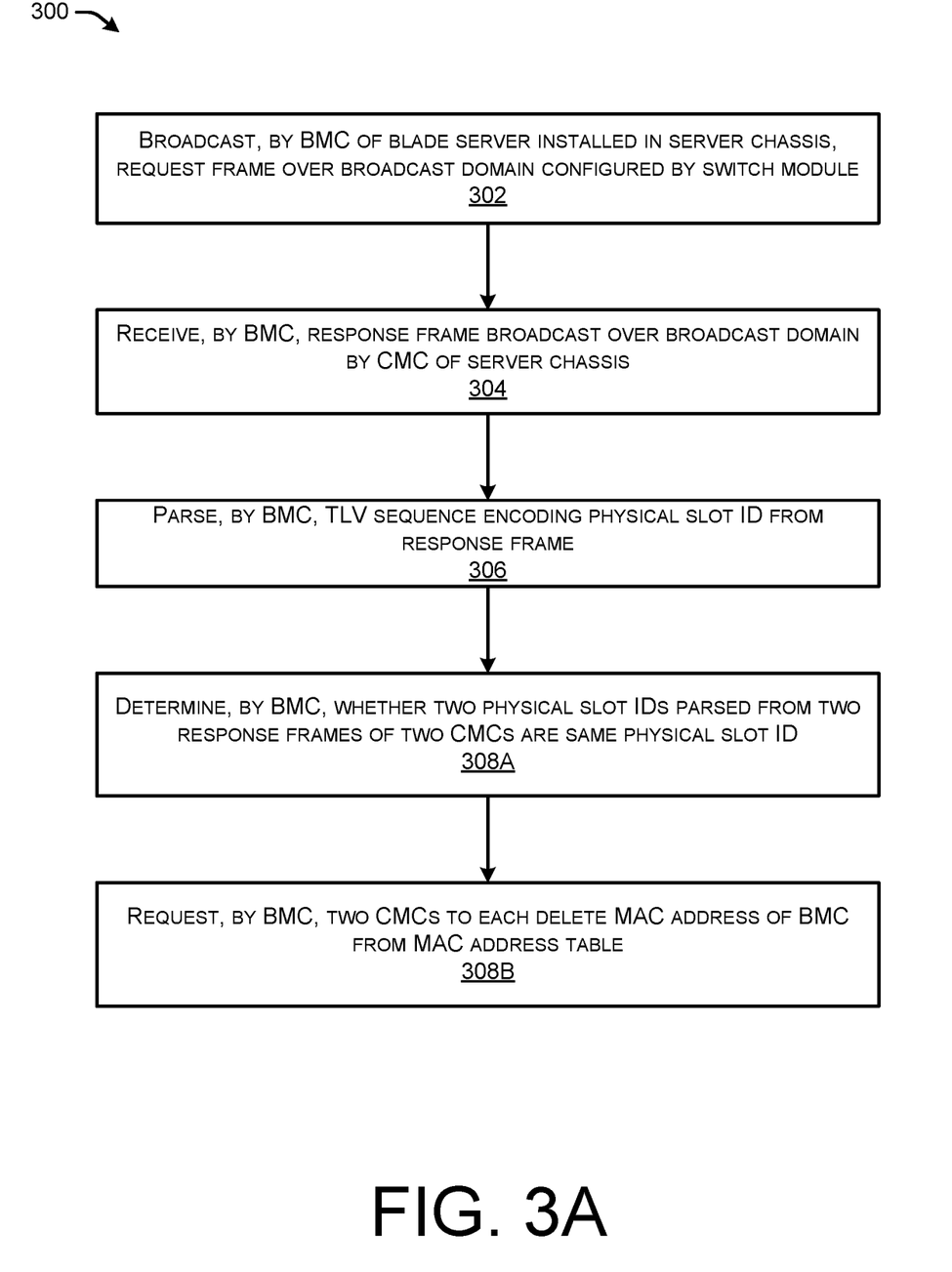
FIGS. 3A and 3B illustrate a BMC-side physical slot inference protocol according to example embodiments of the present disclosure.
Figure 3B:
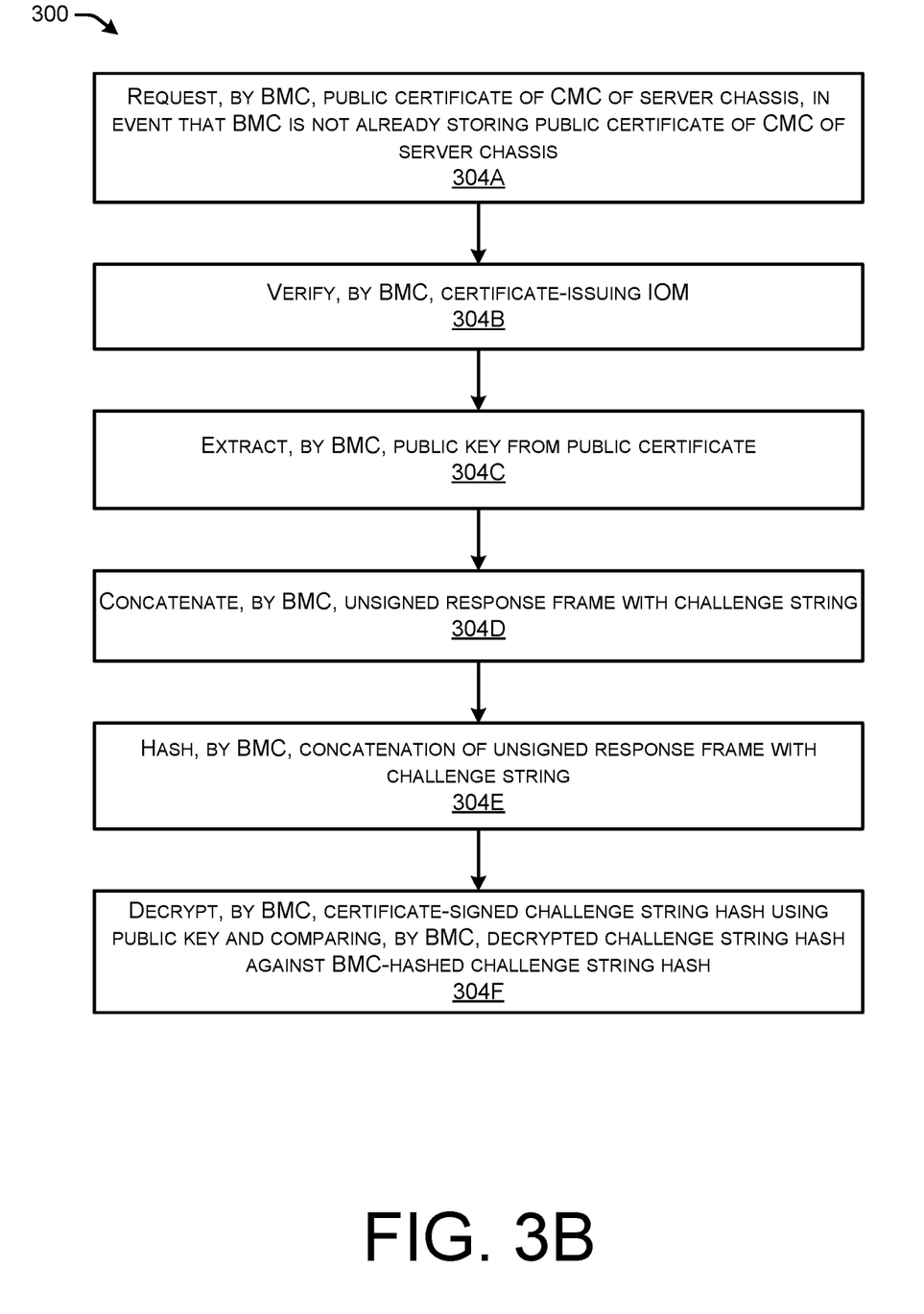

FIGS. 3A and 3B illustrate a BMC-side physical slot inference protocol 300 according to example embodiments of the present disclosure. The steps of the BMC-side physical slot inference protocol 300 are performed by a BMC of a blade server installed in a server chassis exchanging data link layer (i.e., OSI layer 2) Ethernet frames with a CMC of a server chassis (which, as described above, can be either one of two CMCs of the same server chassis) over a management bus 112.

It should be understood that a BMC can be configured to perform each subsequently described step of the BMC-side physical slot inference protocol 300 twice, once for each CMC of the same server chassis. The ordering of any subsequently described step of the BMC-side physical slot inference protocol 300 should be understood as applying to communications with a first CMC (which can be either CMC), and the timing of communications with a second CMC does not need to follow any particular order with regard to communications with the first CMC. However, certain steps require information to have been received from both CMCs before they can be performed; those steps will be described as such.

At a step 302, a BMC of a blade server installed in a server chassis broadcasts a request frame over a broadcast domain configured by a switch module.

A request frame according to the slot inference communication protocol is an Ethernet frame, where a data payload of the Ethernet frame includes a TLV sequence encoding a request category, and includes a TLV sequence encoding a challenge string. After forwarding this request frame, an expected broadcast by the BMC is a response frame broadcast by the CMC over the broadcast domain, the response frame having a data payload which includes a TLV sequence which encodes a physical slot ID.

According to example embodiments of the present disclosure, a challenge string is a string which is stored by the BMC so that the BMC can broadcast the challenge string over the broadcast domain in request frames, and so that the BMC can compare the stored challenge string to a signed challenge string received in response frames broadcast over the broadcast domain.

According to example embodiments of the present disclosure, the BMC sends the request frame during a boot-up sequence of the BMC, as configured by firmware stored on memory of the BMC. The BMC typically boots up after being installed in a server chassis wherein the CMC has already booted up and has already caused a switch module to configure a broadcast domain VLAN as described above with reference to FIG. 2A. Thus, the BMC can be configured to broadcast on a default VLAN, which the switch module, as described above, has already configured as a broadcast domain VLAN.

During a boot-up sequence of the BMC, the BMC can request a public certificate of each CMC of the server chassis, and can store the public certificate of each CMC of the server chassis. The BMC can replace any previously stored public certificate of a CMC with the newly requested public certificate, since, each time the BMC boots up, the blade server of the BMC could have been installed in a different IOM and/or a different server chassis than previously.

The BMC can be further configured to verify that the public certificate includes a subject line which contains an identifier string, the identifier string designating that the public certificate originates from a model of IOM which does not provide a dedicated pin for communicating a physical slot ID to the blade server. Upon verifying this (subsequently "verifying a certificate-issuing IOM," for brevity), the BMC is configured to securely verify signatures issued by each CMC of the server chassis using the public certificate.

However, as shall be subsequently described, the BMC is not necessarily configured to store a public certificate, but rather can request the public certificate from each CMC when needed.

In the event that the expected broadcast is not received during a timeout period as described above, the BMC is configured to retry the current broadcast indefinitely (i.e., retry broadcasting the request frame) until the expected broadcast is received from the CMC. By way of example, the BMC can be configured to retry the current broadcast indefinitely whenever the expected broadcast is not received after approximately five seconds.

It should be understood that the BMC can broadcast multiple request frames, and subsequently wait concurrently for expected broadcasts in response to each current broadcast. For multiple concurrently expected broadcasts in response to multiple respective current broadcasts, whenever the BMC receives any expected broadcast, a respective current broadcast is satisfied, and the BMC no longer retries that current broadcast (but continues to retry any other current broadcasts).

Both of two CMCs of a same server chassis can receive a request frame broadcast by the BMC over the broadcast domain. Each of the two CMCs, in response, broadcasts a response frame over the broadcast domain, the response frame including a TLV sequence encoding a certificate-signed challenge string hash, generated as described above with reference to FIG. 2A.

At a step 304, the BMC receives a response frame broadcast over the broadcast domain by a CMC of the server chassis.

As described above, a response frame according to the slot inference communication protocol is an Ethernet frame, where a data payload of the Ethernet frame includes a TLV sequence encoding a response category, and includes a TLV sequence encoding a physical slot ID.

The BMC is configured to parse the request frame, whereupon it may read, from the data payload of the request frame, a TLV sequence encoding a response category, and a TLV sequence encoding a physical slot ID.

The BMC can receive up to two response frames broadcast from the two CMCs of a same server chassis, each response frame including a TLV sequence encoding a certificate-signed challenge string hash; each of the two CMCs signs the same challenge string using a different private certificate stored by a hardware root of trust of a different IOM. Therefore, the BMC can distinguish the two response frames as being different responses from different CMCs. While one of the two response frames is not received, the BMC will continue to retry broadcasting request frames, expecting the other of the two response frames to be received.

According to an example embodiment of the present disclosure, the BMC can verify the certificate-signed challenge string hash according to the following steps:

At a step 304A, the BMC requests a public certificate of a CMC of the server chassis, in the event that the BMC is not already storing a public certificate of a CMC of the server chassis.

The BMC can receive a public certificate from a broadcast Ethernet frame including a TLV sequence encoding a public certificate of a CMC, as described above.

At a step 304B, the BMC verifies a certificate-issuing IOM, as described above.

At a step 304C, the BMC extracts a public key from the public certificate.

At a step 304D, the BMC concatenates an unsigned response frame with the challenge string.

In accordance with the key inference communication protocol, the BMC can independently write an unsigned response frame expected from the CMC. The BMC can concatenate the unsigned response frame and the challenge string as a string operation in a data structure such as a string buffer.

At a step 304E, the BMC hashes the concatenation of the unsigned response frame with the challenge string.

The BMC can hash the concatenation by a one-way hash function, such as any of the SHA-2 set of cryptographic hash functions, as long as it is the same one-way hash function that the CMC is configured to use.

At a step 304F, the BMC decrypts the certificate-signed challenge string hash using the public key and compares the decrypted challenge string hash against the BMC-hashed challenge string hash.

The BMC can be configured to run certificate validation tools such as OpenSSL to decrypt the certificate-signed challenge string hash. The BMC can then compare the two hashes to determine whether they are identical; if so, the response frame is secure.

At a step 306, the BMC parses a TLV sequence encoding a physical slot ID from the response frame.

The BMC does not parse the TLV sequence encoding a physical slot ID until successfully validating, in this fashion, that the response frame is secure.

In response to successfully validating two different response frames respectively including TLV sequences encoding certificate-signed challenge string hashes with different signatures, and then successfully parsing physical slot IDs from both response frames, the BMC is configured to perform step 308.

At a step 308A, the BMC determines whether two physical slot IDs parsed from two response frames of two CMCs are the same physical slot ID.

In the event that the two physical slot IDs are different, the BMC performs step 308B.

At a step 308B, the BMC requests the two CMCs to each delete a MAC address of the BMC from a MAC address table.

As described above, such an outcome suggests that the MAC address of the BMC has been duplicated at more than one port interface. Thus, the BMC can provide a backup to the CMC determining duplicate MAC addresses, but remediating the duplication rather than causing data traffic from the blade server of the BMC to be blocked entirely.

In the event that the two physical slot IDs are the same, the BMC has determined the physical slot ID of the physical slot where the blade server is installed. The BMC can now use this physical slot ID to configure the blade server to forward data traffic over one or more layer 3 network segments.

Therefore, according example embodiments of the present disclosure, a blade server is installed in a server chassis, where IOMs of the server chassis do not provide dedicated pins for communicating a physical slot ID to the blade server. BMCs of the blade servers and CMCs of IOMs of the server chassis are mutually configured to broadcast Ethernet frames on layer 2 network segments over a broadcast domain configured by a switch module connected to the blade servers over layer 2 network segments. BMCs of the blade servers and CMCs of IOMs of the server chassis are configured to conduct a slot inference communication protocol using these Ethernet frame broadcasts to enable the CMC to determine a physical slot ID in response to a BMC request, and broadcast that physical slot ID back to the BMC. BMCs of the blade servers and CMCs of IOMs of the server chassis are configured to use a public certificate-private certificate pair, based in a hardware root of trust, to enforce security of this communication protocol. In this fashion, blade servers are configured to interoperate with new IOM models of server chassis which allocate I/O pins for functions besides physical slot ID notification.

Figure 4:
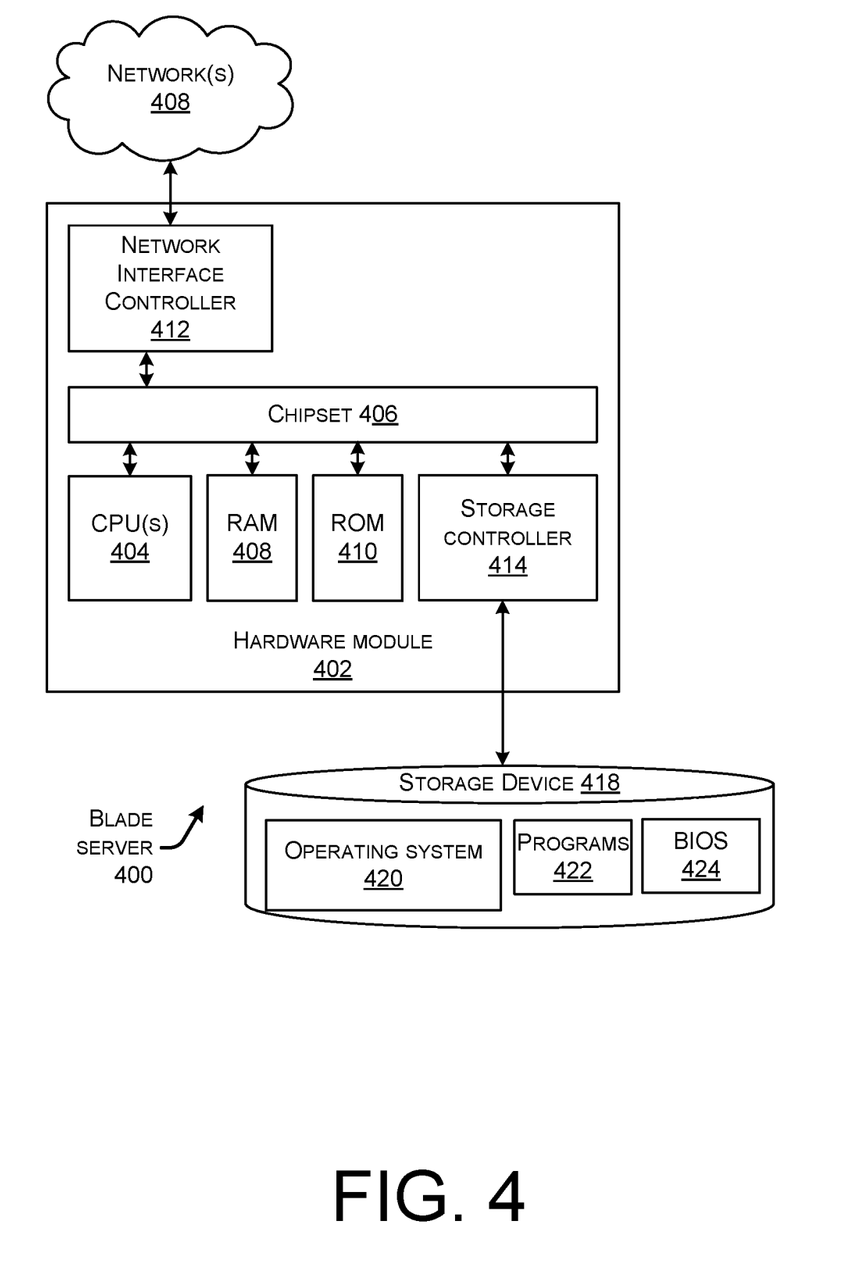
FIG. 4 shows an example computer architecture for a blade server capable of executing program components for implementing the functionality described above.

FIG. 4 shows an example computer architecture for a blade server 400 capable of executing program components for implementing the functionality described above. The computer architecture shown in FIG. 4 illustrates a computing device assembled from modular components, and can be utilized to execute any of the software components presented herein.

One or more hardware modules 402 installed in a blade server 400 may be a physical card or module to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the hardware module 402.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the hardware module 402. The chipset 406 can provide an interface to a RAM 408, used as the main memory in the hardware module 402. The chipset 406 can further provide an interface to a computer-readable storage medium such as a read-only memory ("ROM") 410 or non-volatile RAM ("NVRAM") for storing basic routines that help to startup the hardware module 402 and to transfer information between the various components and devices. The ROM 410 or NVRAM can also store other software components necessary for the operation of the hardware module 402 in accordance with the configurations described herein.

The hardware module 402 can operate in a networked environment using logical connections to remote computing devices and computer systems through a network, such as the broadcast domain as described above. The chipset 406 can include functionality for providing network connectivity through a NIC 412, such as a gigabit Ethernet adapter. The NIC 412 is capable of connecting the hardware module 402 to other computing devices over the network 408. It should be appreciated that multiple NICs 412 can be present in the hardware module 402, connecting the blade server 400 to other types of networks and remote computer systems.

The hardware module 402 can be connected to a storage device 418 that provides non-volatile storage for the hardware module 402. The storage device 418 can store an operating system 420, programs 422, a BIOS 424, and data, which have been described in greater detail herein. The storage device 418 can be connected to the hardware module 402 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC")

interface, or other type of interface for physically connecting and transferring data between computers and physical storage units.

The hardware module 402 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the hardware module 402 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 402 can further read information from the storage device 418 by detecting the physical states or characteristics of one or more particular locations within the physical storage units.

In addition to the mass storage device 418 described above, the hardware module 402 can have access to other computer-readable storage media to store and retrieve information, such as program modules, data structures, or other data. It should be appreciated by those skilled in the art that computer-readable storage media is any available media that provides for the non-transitory storage of data and that can be accessed by the hardware module 402. In some examples, the operations performed by a switch of the network overlay, and or any components included therein, may be supported by one or more devices similar to the hardware module 402. Stated otherwise, some or all of the operations performed by a switch of the network overlay, and or any components included therein, may be performed by one or more hardware modules 402 operating in a networked, distributed arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the hardware module 402. According to one embodiment, the operating system comprises the WINDOWS SERVER operating system and derivatives thereof from MICROSOFT CORPORATION of Redmond, Washington. According to another embodiment, the operating system comprises the ENTERPRISE LINUX operating system from RED HAT, INC. of Raleigh, North Carolina. According to another embodiment, the operating system comprises the SUSE LINUX operating system from SUSE, S.A. of Luxembourg. According to another embodiment, the operating system comprises the VSPHERE operating system from VMWARE, INC. of Palo Alto, California. It should be appreciated that other operating systems can also be utilized. The storage device 418 can store other system or application programs and data utilized by the hardware module 402.

In one embodiment, the storage device 418 or other computer-readable storage media is encoded with computer-executable instructions which, when loaded into a computer, transform the computer from a general-purpose computing system into a special-purpose computer capable of implementing the embodiments described herein. These computer-executable instructions transform the hardware module 402 by specifying how the CPUs 404 transition between states, as described above. According to one embodiment, the hardware module 402 has access to computer-readable storage media storing computer-executable instructions which, when executed by the hardware module 402, perform the various processes described above with regard to FIGS. 1-3B. The hardware module 402 can also include computer-readable storage media having instructions stored thereupon for performing any of the other computer-implemented operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A chassis management controller ("CMC") of a server chassis, comprising:
   one or more processors; and
   one or more non-transitory computer-readable media storing computer-executable instructions that, when executed by the one or more processors, cause the one or more processors to:
   receive a request frame broadcast over a broadcast domain from a baseboard management controller ("BMC") of a blade server installed in the server chassis;
   send a medium access control ("MAC") address of the BMC over a management bus or I/O pin to a switch module connected to the CMC by a network segment;
   receive a port interface from the switch module over the management bus or I/O pin;
   determine, based on the port interface, whether the MAC address has been duplicated at more than one port interface;
   block, for a plurality of port interfaces corresponding to a duplicated MAC address, network traffic from all but one of the plurality of port interfaces;

determine a physical slot ID mapped to the port interface based on integrated circuits of an I/O module ("IOM") of the server chassis; and broadcast a response frame over the broadcast domain.

2. The CMC of claim 1, wherein the broadcast domain comprises a virtual local area network ("VLAN") configured by the switch module over one or more network segments connected to the switch module, the VLAN including one or more blade servers installed in the server chassis.

3. The CMC of claim 1, wherein the instructions further cause the one or more processors to periodically broadcast an echo frame over the broadcast domain.

4. The CMC of claim 1, wherein the response frame comprises a Type-Length-Value ("TLV") sequence encoding a physical slot ID, and a TLV sequence encoding a certificate-signed challenge string hash.

5. The CMC of claim 4, wherein the challenge string hash comprises a hash of a challenge string parsed from the request frame.

6. The CMC of claim 5, wherein the certificate-signed challenge string hash is signed by a hardware root of trust of the CMC using a private key of a private cryptographic certificate.

7. A method comprising:
receiving, by a chassis management controller ("CMC") of a server chassis, a request frame broadcast over a broadcast domain from a baseboard management controller ("BMC") of a blade server installed in the server chassis;
sending, by the CMC, a medium access control ("MAC") address of the BMC over a management bus or I/O pin to a switch module connected to the CMC by a network segment;
receiving, by the CMC, a port interface from the switch module over the management bus or I/O pin;
determining, by the CMC, based on the port interface, whether the MAC address has been duplicated at more than one port interface;
blocking, by the CMC, for a plurality of port interfaces corresponding to a duplicated MAC address, network traffic from all but one of the plurality of port interfaces;
determining, by the CMC, a physical slot ID mapped to the port interface based on integrated circuits of an I/O module ("IOM") of the server chassis; and
broadcasting, by the CMC, a response frame over the broadcast domain.

8. The method of claim 7, wherein the broadcast domain comprises a virtual local area network ("VLAN") configured by the switch module over one or more network segments connected to the switch module, the VLAN including one or more blade servers installed in the server chassis.

9. The method of claim 7, further comprising periodically broadcasting, by the CMC, an echo frame over the broadcast domain.

10. The method of claim 7, wherein the response frame comprises a Type-Length-Value ("TLV") sequence encoding a physical slot ID, and a TLV sequence encoding a certificate-signed challenge string hash.

11. The method of claim 10, wherein the challenge string hash comprises a hash of a challenge string parsed from the request frame.

12. The method of claim 11, wherein the certificate-signed challenge string hash is signed by a hardware root of trust of the CMC using a private key of a cryptographic certificate.

13. A baseboard management controller ("BMC") of a blade server installed in a server chassis, comprising:
one or more processors; and
one or more non-transitory computer-readable media storing computer-executable instructions that, when executed by the one or more processors, cause the one or more processors to:
broadcast a request frame over a broadcast domain configured by a switch module;
receive a first response frame broadcast over the broadcast domain by a first chassis management controller ("CMC") of the server chassis;
retry broadcasting request frames until a second response frame broadcast by a second CMC of the server chassis is received;
parse a Type-Length-Value ("TLV") sequence encoding a physical slot ID from each response frame;
determine that two physical slot IDs parsed from the first response frame and the second response frame are the same physical slot ID;
request the first CMC and the second CMC to each delete a medium access control ("MAC") address of the BMC from a MAC address table; and
configure the blade server to forward data traffic over one or more layer 3 network segments based on the physical slot ID.

14. The BMC of claim 13, wherein the instructions further cause the one or more processors to request a public cryptographic certificate of each CMC of the server chassis.

15. The BMC of claim 14, wherein the instructions further cause the one or more processors to verify that the public cryptographic certificate includes a subject line which contains an identifier string, the identifier string designating that the public certificate originates from a model of I/O module ("IOM") which does not provide a dedicated pin for communicating a physical slot ID to the blade server.

16. The BMC of claim 13, wherein the first response frame and the second response frame each includes a TLV sequence encoding a certificate-signed challenge string hash.

17. The BMC of claim 16, wherein the instructions further cause the one or more processors to decrypt the certificate-signed challenge string hash using a public key of a public cryptographic certificate of the server chassis, and compare the decrypted challenge string hash against a challenge string hash generated by the BMC.

* * * * *